United States Patent
Wu

(10) Patent No.: US 8,693,364 B2
(45) Date of Patent: Apr. 8, 2014

(54) METHOD AND RELATED COMMUNICATION DEVICE FOR PARAMETER RECONFIGURATION IN A WIRELESS COMMUNICATIONS SYSTEM

(75) Inventor: Chih-Hsiang Wu, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 0 days.

(21) Appl. No.: 13/370,328

(22) Filed: Feb. 10, 2012

(65) Prior Publication Data

US 2012/0140691 A1 Jun. 7, 2012

Related U.S. Application Data

(62) Division of application No. 12/605,385, filed on Oct. 26, 2009, now Pat. No. 8,315,182.

(60) Provisional application No. 61/110,951, filed on Nov. 3, 2008.

(51) Int. Cl.
*H04J 1/16* (2006.01)
*H04J 3/14* (2006.01)

(52) U.S. Cl.
USPC .......................................................... 370/252

(58) Field of Classification Search
USPC .......................................................... 370/252
See application file for complete search history.

(56) References Cited

U.S. PATENT DOCUMENTS

| | | | | |
|---|---|---|---|---|
| 8,285,346 B2* | 10/2012 | Fodor et al. | ................... | 455/574 |
| 2007/0106924 A1 | 5/2007 | Seidel | | |
| 2007/0291728 A1 | 12/2007 | Dalsgaard | | |
| 2008/0232310 A1* | 9/2008 | Xu | ................... | 370/329 |
| 2008/0268845 A1* | 10/2008 | Wu et al. | ................... | 455/436 |
| 2009/0253470 A1* | 10/2009 | Xu | ................... | 455/574 |
| 2009/0285141 A1* | 11/2009 | Cai et al. | ................... | 370/311 |
| 2010/0037114 A1* | 2/2010 | Huang et al. | ................... | 714/749 |
| 2010/0136992 A1* | 6/2010 | Harada et al. | ................... | 455/450 |
| 2010/0144299 A1* | 6/2010 | Ren | ................... | 455/226.1 |
| 2010/0150086 A1* | 6/2010 | Harada et al. | ................... | 370/329 |
| 2010/0184458 A1* | 7/2010 | Fodor et al. | ................... | 455/522 |
| 2010/0195640 A1 | 8/2010 | Park | | |
| 2010/0284376 A1 | 11/2010 | Park | | |
| 2011/0002262 A1 | 1/2011 | Wang | | |
| 2011/0039536 A1* | 2/2011 | Lee et al. | ................... | 455/422.1 |
| 2011/0211466 A1* | 9/2011 | Kazmi | ................... | 370/252 |
| 2012/0014304 A1* | 1/2012 | Cai et al. | ................... | 370/311 |

OTHER PUBLICATIONS

Office action mailed on May 3, 2012 for the U.S. Appl. No. 12/605,385, filed Oct. 26, 2009, p. 1-15.
3GPP TSG-RAN2 Meeting #63bis R2-085391, Sep. 2008.
3GPP TSG-RAN2#63bis meeting R2-085979, Sep. 2008.
TSG-RAN WG2 Meeting #63bis R2-085390, Sep. 2008.

(Continued)

*Primary Examiner* — Farah Faroul
(74) *Attorney, Agent, or Firm* — Winston Hsu; Scott Margo

(57) ABSTRACT

A method for reconfiguring parameters of a discontinuous reception operation of a medium access control layer for a mobile device of a wireless communication system includes when a radio resource control dedicated signaling for disabling a short cycle mode of the discontinuous reception operation is received during activation of the short cycle mode, switching from the short cycle mode to a long cycle mode of the discontinuous reception operation.

2 Claims, 13 Drawing Sheets

(56) References Cited

OTHER PUBLICATIONS

Asustek: "Reconfiguration of MAC-hs parameters", 3GPP TSG-RAN2 Meeting #47, Tdoc R2-051533, May 9-13, 2005, front page plus p. 3, XP050128717, Athens, Greece.

Research in Motion Ltd: "Go to Long Sleep Command for LTE DRX", 3GPP TSG-RAN-WG2 Meeting #61bis, R2-081868, Mar. 31-Apr. 4, 2008, pp. 1-4, XP050139558, Shenzhen, China.

Samsung: "Clarifications and corrections on connection control", 3GPP TSG-RAN2#63bis Meeting, Tdoc R2-085653, Sep. 29-Oct. 3, 2008, pp. 1-23, XP050320440, Prague, Czech Republic.

Asustek: "Reconfiguration of MAC-hs parameters", 3GPP TSG-RAN2 Meeting #47, Tdoc R2-051533, May 9-13, 2005, pp. 1-3, XP050128717, Athens, Greece.

Ericsson: "Details of MAC DRX Control", TSG-RAN WG2 Meeting #61, R2-080934, Feb. 11-15, 2008, pp. 1-5, XP050138737, Sorento, Italy.

Ericsson: "Discussion on MAC reset and reconfiguration", TSG-RAN WG2 Meeting #62bis, Tdoc R2-083142, Jun. 30-Jul. 4, 2008, pp. 1-2, XP050140574, Warsaw, Poland.

Ericsson: "Text proposal on MAC reset and reconfiguration", 3GPP TSG-RAN2 Meeting #62bis, R2-083143, Jun. 30-Jul. 4, 2008, p. 1-3, XP050140575, Warsaw, Poland.

HTC Corporation: "Clarification on MAC reconfiguration and MAC reset", 3GPP TSG-RAN2 Meeting #64bis, R2-090127, Jan. 12-16, 2009, pp. 1-2, XP050322164, Ljubljana, Slovenia.

\* cited by examiner

METHOD AND RELATED COMMUNICATION DEVICE FOR PARAMETER RECONFIGURATION IN A WIRELESS COMMUNICATIONS SYSTEM

CROSS REFERENCE TO RELATED APPLICATIONS

This application is a divisional application of U.S. application Ser. No. 12/605,385, filed on Oct. 26, 2009, which claims the benefit of U.S. Provisional Application No. 61/110,951, filed on Nov. 3, 2008 and entitled "METHOD AND APPARATUS FOR MAC PARAMETERS RECONFIGURATION IN A WIRELESS COMMUNICATIONS SYSTEM" the contents of which are incorporated herein.

BACKGROUND OF THE INVENTION

1. Field of the Invention

The present invention relates to a method utilized in a wireless communication and communication device thereof, and more particularly, to a method of reconfiguring parameters of a medium access control (MAC) layer in a wireless communication system and communication device thereof.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile stations, also referred as user equipments (UEs).

A radio interface protocol of the LTE system includes three layers: the Physical Layer (L1), the Data Link Layer (L2), and the Network Layer (L3), wherein a control plane of L3 is a Radio Resource Control (RRC) layer, and L2 is further divided into a Packet Data Convergence Protocol (PDCP) layer, a Radio Link Control (RLC) layer and a Medium Access Control (MAC) layer.

Main services and functions of the MAC layer include mapping between logical channels and transport channels; multiplexing/demultiplexing of PDUs (Packet Data Units) belonging to one or different radio bearers into/from transport blocks (TBs) delivered to/from the physical layer on transport channels; buffer status reporting; power headroom reporting; error correction through HARQ; priority handling between logical channels of one UE; discontinuous reception (DRX); priority handling between UEs by means of dynamic scheduling; and padding.

Various MAC parameters, such as timers and counters, are employed for the abovementioned functions/services and are configured or reconfigured by the RRC layer. In RRC (re) configuration, the MAC parameters are grouped into a "MAC-MainConfiguration" information element (IE). When the MAC parameters of the UE are reconfigured by the RRC layer of the EUTRAN, two ways are used for reconfiguration of MAC parameters. In the first way, the UE receives the MAC parameters from broadcasted system information and then receives MAC parameters from dedicated RRC signaling, e.g. a RRC CONNECTION RECONFIGURATION message. In the second way, the UE only receives the MAC parameters from dedicated RRC signaling, e.g. a RRC CONNECTION RECONFIGURATION message.

In DRX parameters of the "MAC-MainConfiguration" IE, a short DRX parameter has choices of 'disable', 'NULL', and 'enable'. When the short DRX parameter is set to 'disable', a short DRX cycle is possibly still configured with a value, and thereby the short DRX parameter is not substantially disabled, but only nominally. This causes a system error.

The MAC parameters may be reconfigured when they are in use. According to the prior art, the reconfigured MAC parameters is required to be applied immediately. For example, a timer value is received for reconfiguration of a currently-running timer. The timer is immediately restarted with the reconfigured timer value. However, enforcing a newly-reconfigured value on an in-use MAC parameter can cause errors of corresponding function/system or impact communication system performance.

SUMMARY OF THE INVENTION

Therefore, the present invention provides a method of reconfiguring parameters of a MAC layer in a wireless communication system and related communication device so at to solve the abovementioned problems.

The present invention further discloses a method for reconfiguring parameters of a discontinuous reception operation of a MAC layer for a mobile device of a wireless communication system. The method includes, when a RRC dedicated signaling for disabling a short cycle mode of the discontinuous reception operation is received during activation of the short cycle mode, switching from the short cycle mode to a long cycle mode of the discontinuous reception operation.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
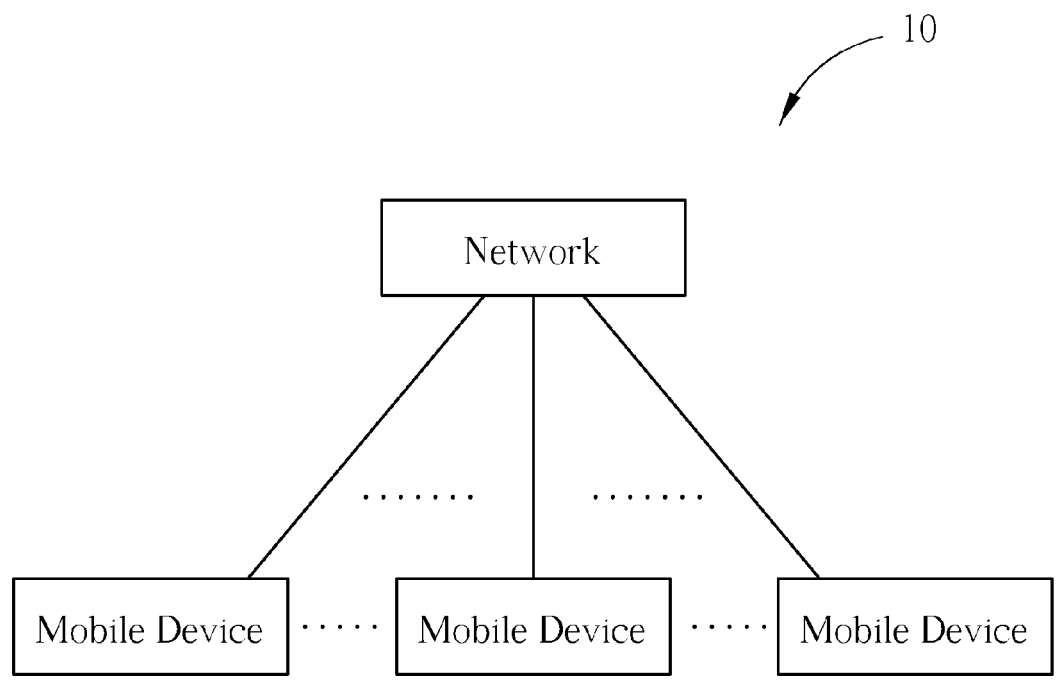
FIG. 1 is a schematic diagram of a wireless communication system.

Please refer to FIG. 1, which illustrates a schematic diagram of a wireless communication system 10 according to an embodiment of the present invention. Briefly, the wireless communication system 10 is composed of a network and a plurality of mobile devices. In FIG. 1, the network and the mobile devices are simply utilized for illustrating the structure of the wireless communication system 10. The wireless communication system 10 can be a UMTS (Universal Mobile Telecommunications System) or an LTE (long-term evolution) system. In the LTE system, the network is referred as a EUTRAN (evolved-UTRAN) comprising a plurality of eNBs, whereas the mobile devices are referred as user equipments (UEs). The UEs can be devices such as mobile phones, computer systems, etc. Besides, the network and the UE can be seen as a transmitter or receiver according to transmission direction, e.g., for uplink (UL), the UE is the transmitter and the network is the receiver, and for downlink (DL), the network is the transmitter and the UE is the receiver.

Figure 2:
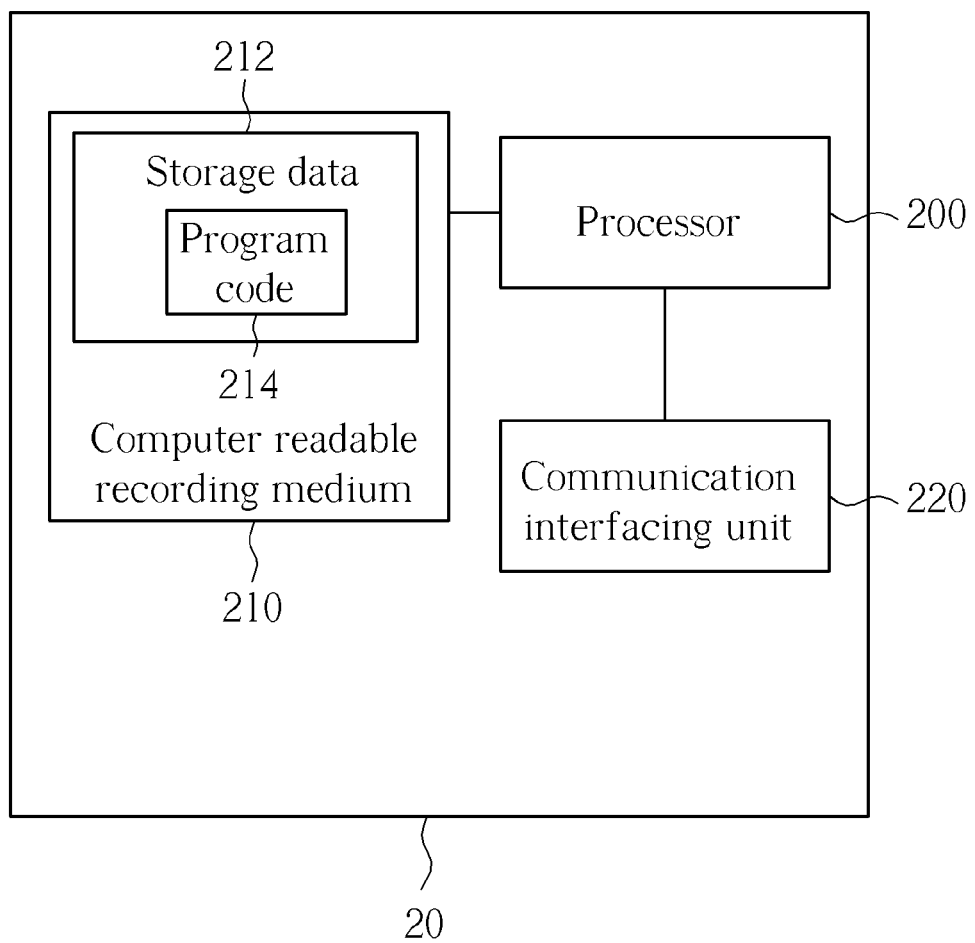
FIG. 2 is a schematic diagram of a communication device according to an embodiment of the present invention.

Please refer to FIG. 2, which illustrates a schematic diagram of a communication device 20 according to an embodiment of the present invention. The communication device 20 can be the mobile devices shown in FIG. 1 and includes a processor 200, a computer readable recording medium 210 and a communication interfacing unit 220. The computer readable recording medium 210 is any data storage device that includes program code 214, thereafter read and processed by the processor 200. Examples of the computer readable recording medium 210 include a subscriber identity module (SIM), read-only memory (ROM), random-access memory (RAM), CD-ROMs, magnetic tapes, hard disks, optical data storage devices, and carrier waves (such as data transmission through the Internet). The communication interfacing unit 220 is preferably a radio transceiver and accordingly exchanges wireless signals with the network.

Figure 3:
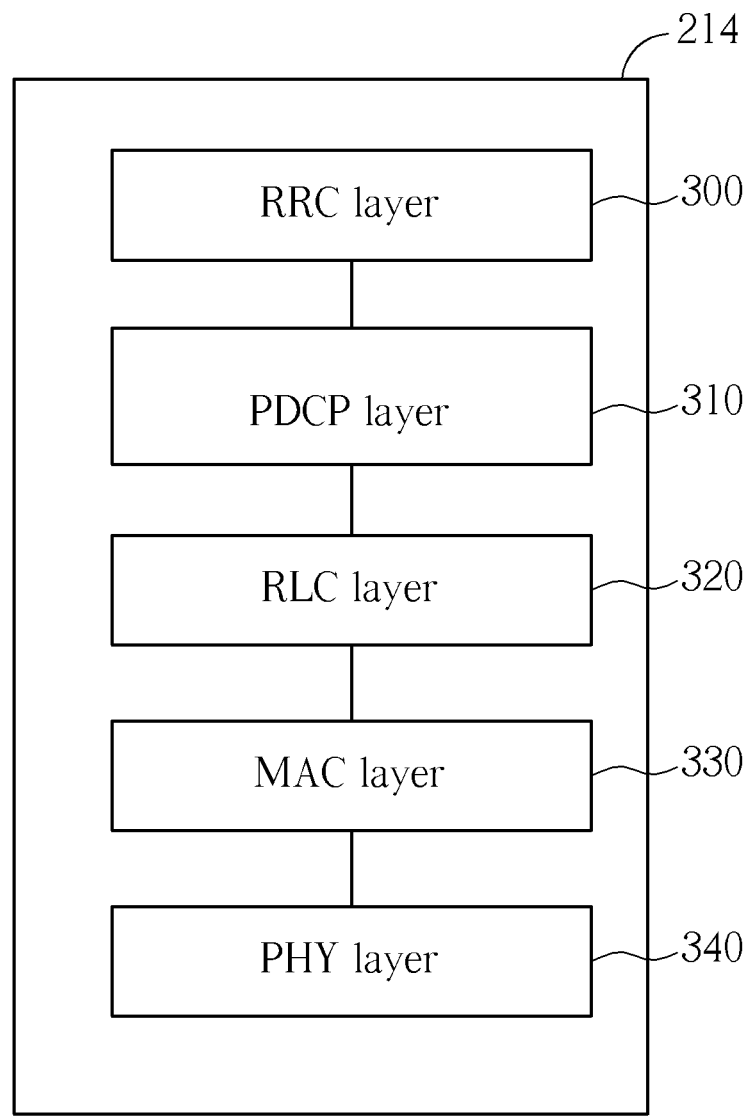
FIG. 3 is a schematic diagram of multiple communications protocol layers.

Please refer to FIG. 3, which illustrates a schematic diagram of multiple communications protocol layers of the LTE system applied by the program code 214 according to an embodiment of the present invention. The program code 214 includes program code of multiple communications protocol layers, which from top to bottom are a radio resource control (RRC) layer 300, a packet data convergence protocol (PDCP) layer 310, a radio link control (RLC) layer 320, a medium access control (MAC) layer 330 and a physical (PHY) layer 340.

The MAC layer 330 is capable of performing various functions, such as packet transfer, discontinuous reception (DRX), power headroom reporting, buffer status reporting, TTI (Transmission Time Interval) bundling etc. Accordingly, the RRC layer 300 employs an "MAC-MainConfiguration" information element (IE) to configure/reconfigure the MAC layer 330. The "MAC-MainConfiguration" IE can be generated by the RRC layer 300 or the network. If the "MAC-MainConfiguration" IE is generated by the network, the "MAC-MainConfiguration" IE can be included in a RRC CONNECTION RECONFIGURATION message used as dedicated signaling and then sent to the communication device 20. In addition, when the RRC layer 300 receives a RRC CONNECTION RECONFIGURATION message including a mobilityControlInformation IE, the communication device 20 is directed to perform a handover procedure. The mobilityControlInformation IE is considered a handover-featured IE.

The "MAC-MainConfiguration" includes configuration of a DL-SCH (Downlink Shared Channel), a UL-SCH (Uplink Shared Channel), the DRX function, the power headroom reporting function, and the buffer status reporting function, and thereby has various timers, such as a time alignment timer, a periodicBSR timer, an on-duration timer, etc.

Figure 4:
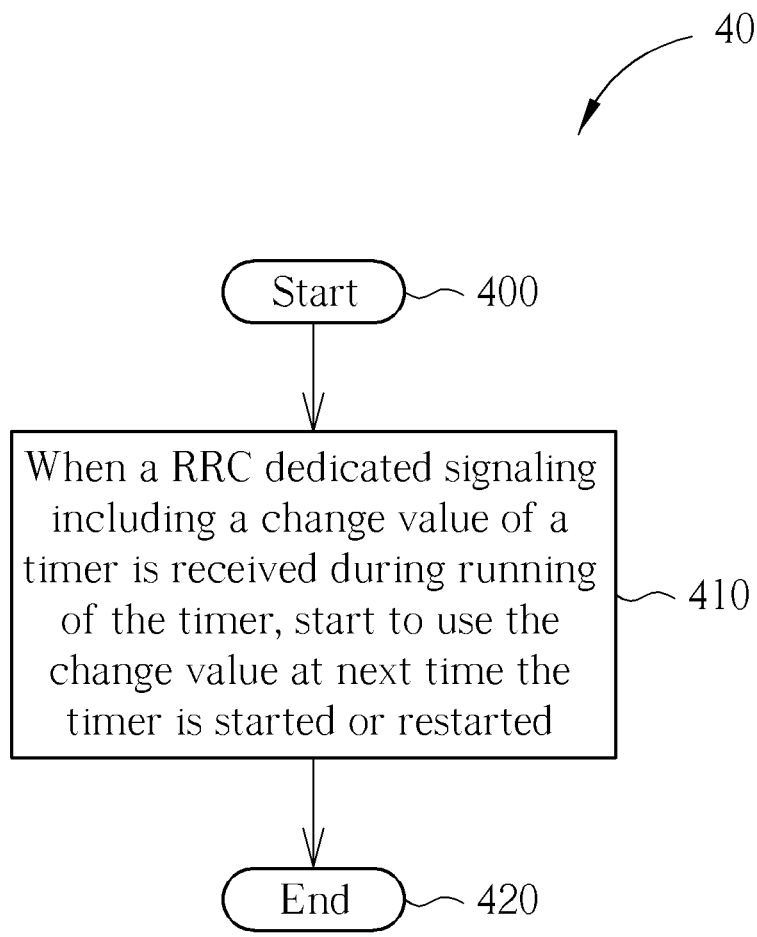
FIGS. 4-13 are flowcharts of processes according to embodiments of the present invention.

When any of the abovementioned timers has been activated to run, a process is provided as below to prevent errors in the MAC layer caused by enforcement of a timer value change. Please refer to FIG. 4, which illustrates a flowchart of a process 40 according to an embodiment of the present invention. The process 40 is utilized for reconfiguring MAC parameters for a UE of a wireless communication system. The process 40 can be compiled into the program code 214 and includes the following steps:

Step 400: Start.

Step 410: When a RRC dedicated signaling including a change value of a timer is received during running of the timer, start to use the change value at next time the timer is started or restarted.

Step 420: End.

According to the process 40, when the timer has been running and the UE receives the RRC dedicated signaling including the change value, the UE starts to use the change value at next time the timer is started or restarted. That is, after the timer expires and is started to run again, the change value is applied for the timer. Through the process 40, the UE does not immediately change the value of the running timer, and therefore unexpected system errors are avoided.

Preferably, the RRC dedicated signaling is a RRC CONNECTION RECONFIGURATION message including a "MAC-MainConfiguration" information element (IE).

Figure 5:
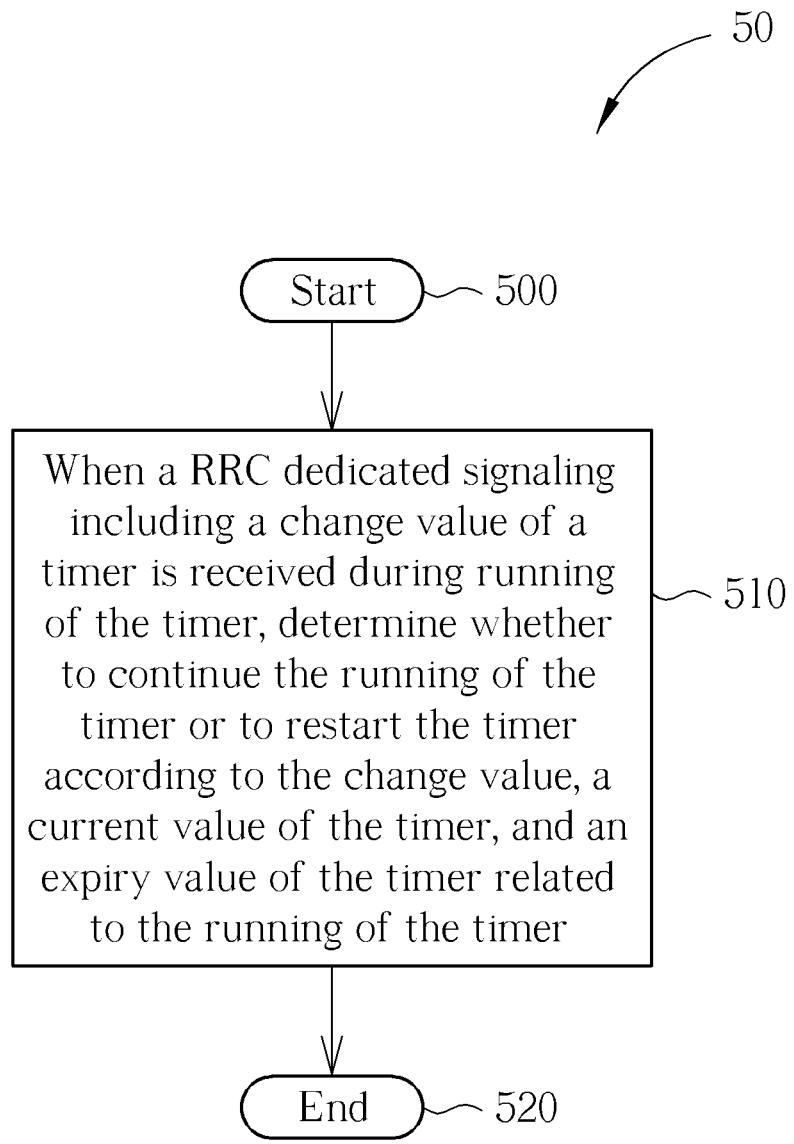

Please refer to FIG. 5, which illustrates a flowchart of a process 50 according to an embodiment of the present invention. The process 50 is utilized for reconfiguring MAC parameters for a UE of a wireless communication system. The process 50 can be compiled into the program code 214 and includes the following steps:

Step 500: Start.

Step 510: When a RRC dedicated signaling including a change value of a timer is received during running of the timer, determine whether to continue the running of the timer or to restart the timer according to the change value, a current value of the timer, and an expiry value of the timer related to the running of the timer.

Step 520: End.

According to the process 50, the UE determines whether to continue the running of the timer or to restart the timer according to the change value, the current value and the expiry value when the change value included in the RRC dedicated signaling is received during the running of the timer. The current value is the value of the timer obtained when the change value is received; the expiry value is the value at which the timer stops running.

Figure 6:
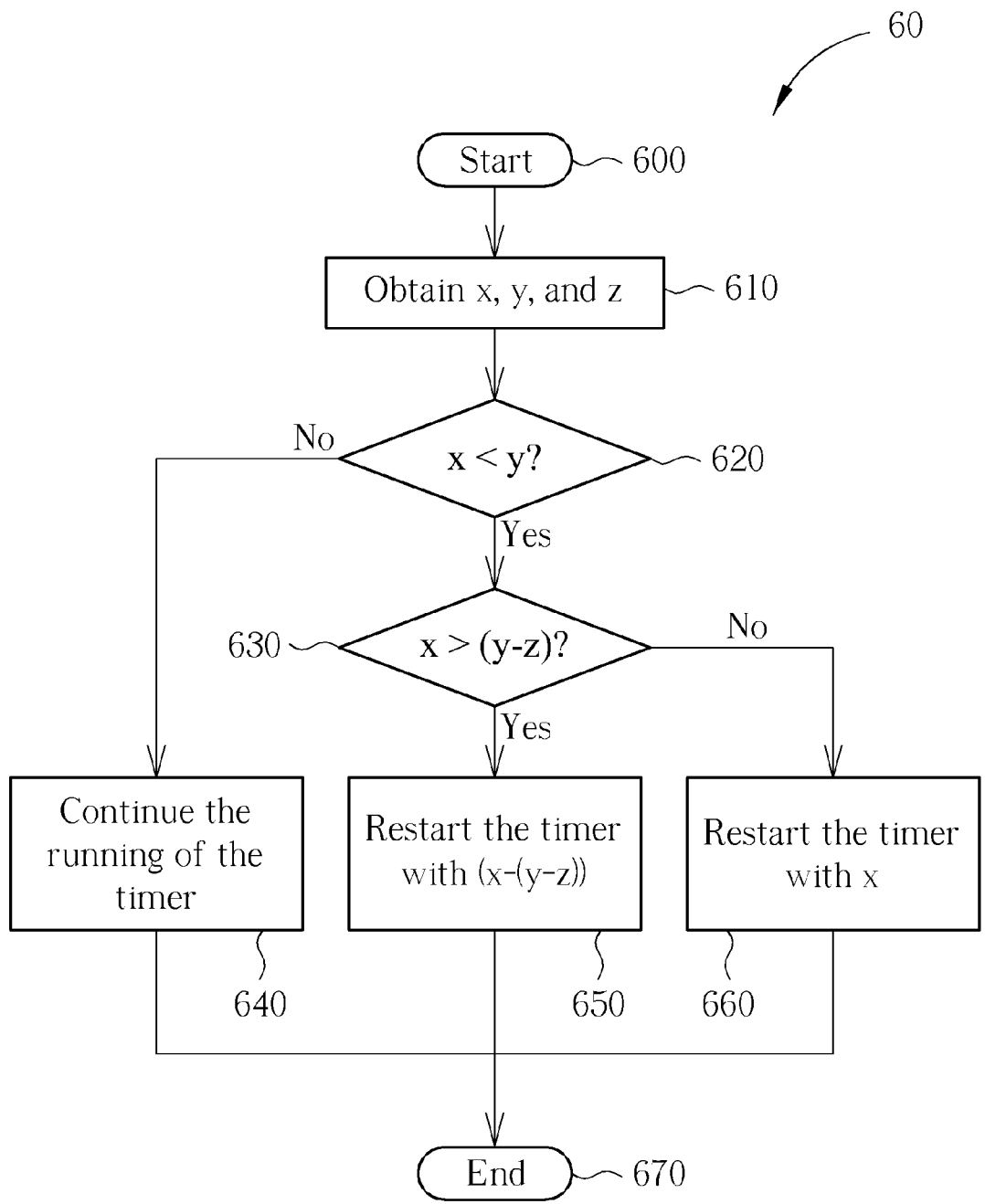

Another embodiment based on the concept of the process 50 is provided as follows. Assume that the current value is z, the expiry value is y, and the change value is x. In addition, the timer performs increasing time counting and thereby y is larger than z. Please refer to FIG. 6, which illustrates a flowchart of a process 60 according to an embodiment of the present invention. The process 60 is used for determining whether to continue the running of the timer or to restart the timer and includes the following steps:

Step 600: Start.

Step 610: Obtain x, y, and z.

Step 620: Determine whether x is smaller than y? If so, perform Step 630, else perform Step 640.

Step 630: Determine whether x is larger than (y−z)? If so, perform Step 650, else perform Step 660.

Step 640: Continue the running of the timer and then perform Step 670.

Step 650: Restart the timer with (x−(y−z)) and then perform Step 670.

Step 660: Restart the timer with x.

Step 670: End.

As can be seen from the process 60, the UE continues the running of the timer when x is larger than or equal to y, restarts the timer with (x−(y−z)) when x is smaller than y and larger than (y−z), and restarts the timer with x when x is smaller than or equal to (y−z). At any expiry of Steps 640-660, the UE further starts/restarts the timer with x when next opportunity of starting/restarting the timer occurs.

When x is larger than y, the UE does not immediately change the timer to x and thereby avoids an erroneous situation that the current value of the timer is larger than the expiry value. (y−z) means a left time of the timer to expiry. As a result, the timer is reconfigured to an extent count time compared to the original total count time through Steps 650-660. Through the process 60, the running timer is properly reconfigured to avoid system errors.

Figure 7:
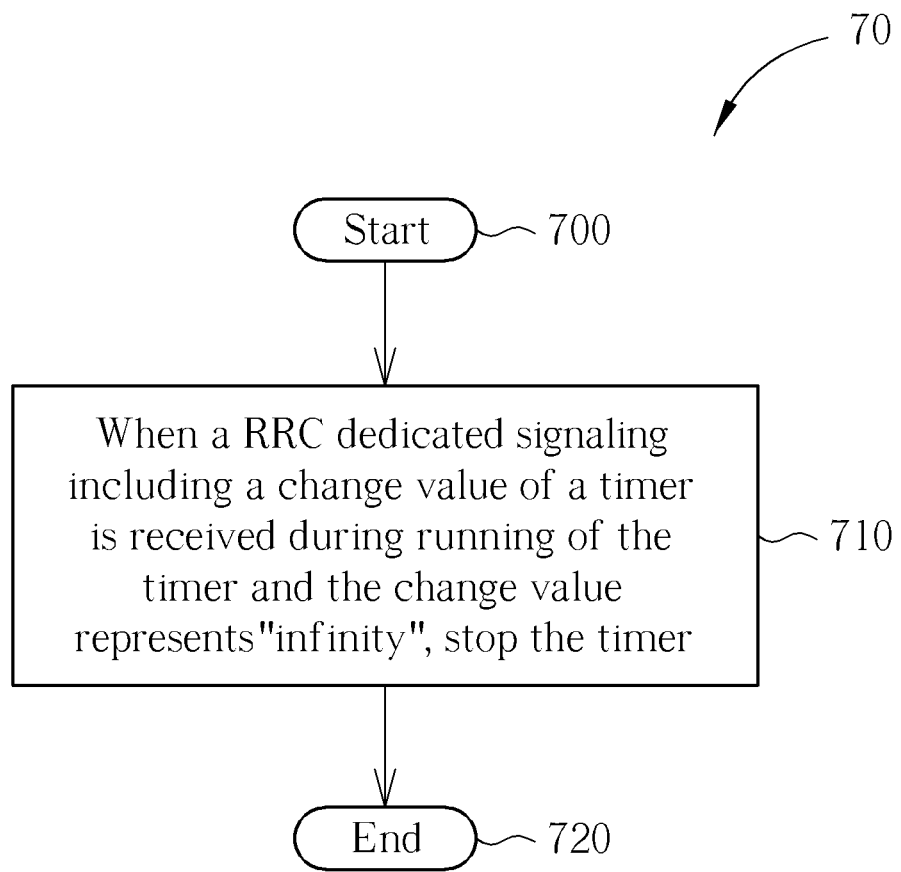

Please refer to FIG. 7, which illustrates a flowchart of a process 70 according to an embodiment of the present invention. The process 70 is utilized for reconfiguring MAC parameters for a UE of a wireless communication system. The process 70 can be compiled into the program code 214 and includes the following steps:

Step 700: Start.

Step 710: When a RRC dedicated signaling including a change value of a timer is received during running of the timer and the change value represents "infinity", stop the timer.

Step 720: End.

According to the process 70, the UE stops the running timer when the RRC dedicated signaling with the "infinity" change value is received. Since the "infinity" change value can cause severe system errors if the timer is immediately reconfigured to the "infinity" change value, the UE stops the timer to avoid the system errors.

Preferably, the "infinity" change value is a predetermined value or character. The RRC dedicated signaling is the RRC CONNECTION RECONFIGURATION message including the "MAC-MainConfiguration" IE.

In the processes 50-70, the UE mainly determines how to deal with the MAC parameter according to the change value.

Figure 8:
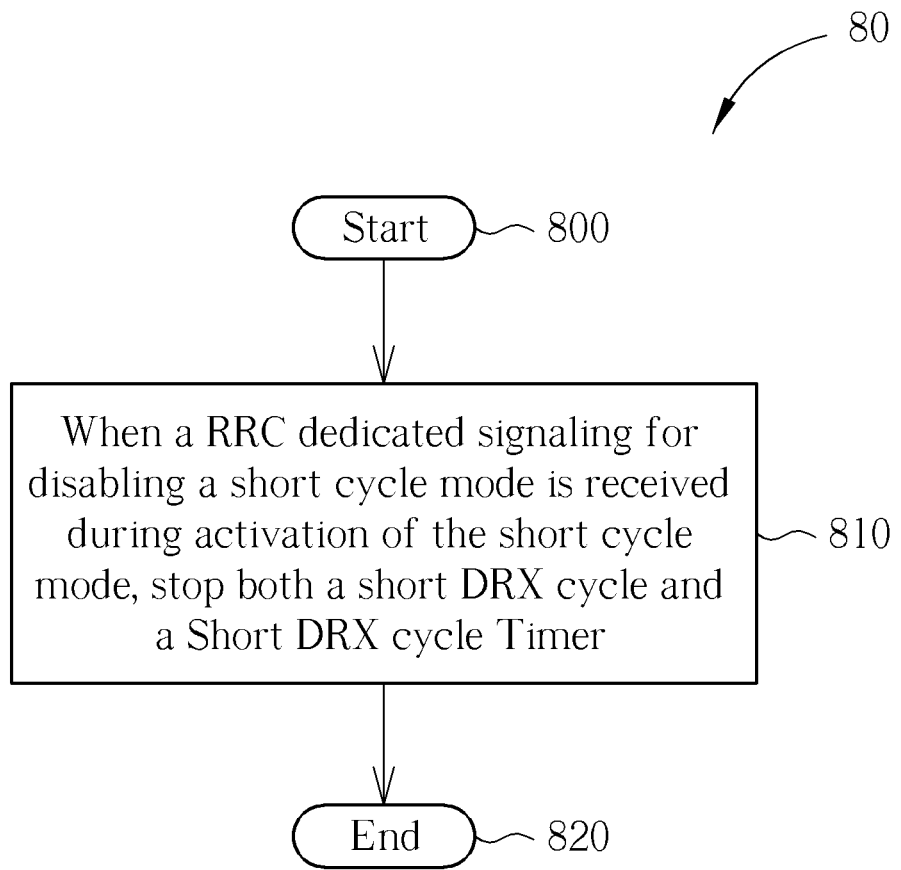

The DRX function of the MAC layer has short and long cycle modes. In the short cycle mode, a Short DRX cycle timer is used for providing a time length in which the UE shall perform the short cycle mode. That is, running of the Short DRX cycle timer means that the short cycle mode is activated. In this situation, following processes are provided to prevent DRX operation errors. Please refer to FIG. 8, which illustrates a flowchart of a process 80 according to an embodiment of the present invention. The process 80 is utilized for reconfiguring MAC DRX parameters for a UE of a wireless communication system. The process 80 can be compiled into the program code 214 and includes the following steps:

Step 800: Start.

Step 810: When a RRC dedicated signaling for disabling a short cycle mode is received during activation of the short cycle mode, stop both a short DRX cycle and a Short DRX cycle Timer.

Step 820: End.

According to the process 80, the UE stops both the short DRX cycle and the Short DRX cycle Timer when the RRC dedicated signaling for disabling a short cycle mode is received and the short cycle mode is in-use. Furthermore, the UE can start to use the long cycle mode (e.g. employing a DRX long cycle) after the short cycle mode is deactivated, more specifically at next cycle after the short cycle mode is deactivated. The UE can further stop the Short DRX cycle Timer to deactivate the short cycle mode.

Figure 9:
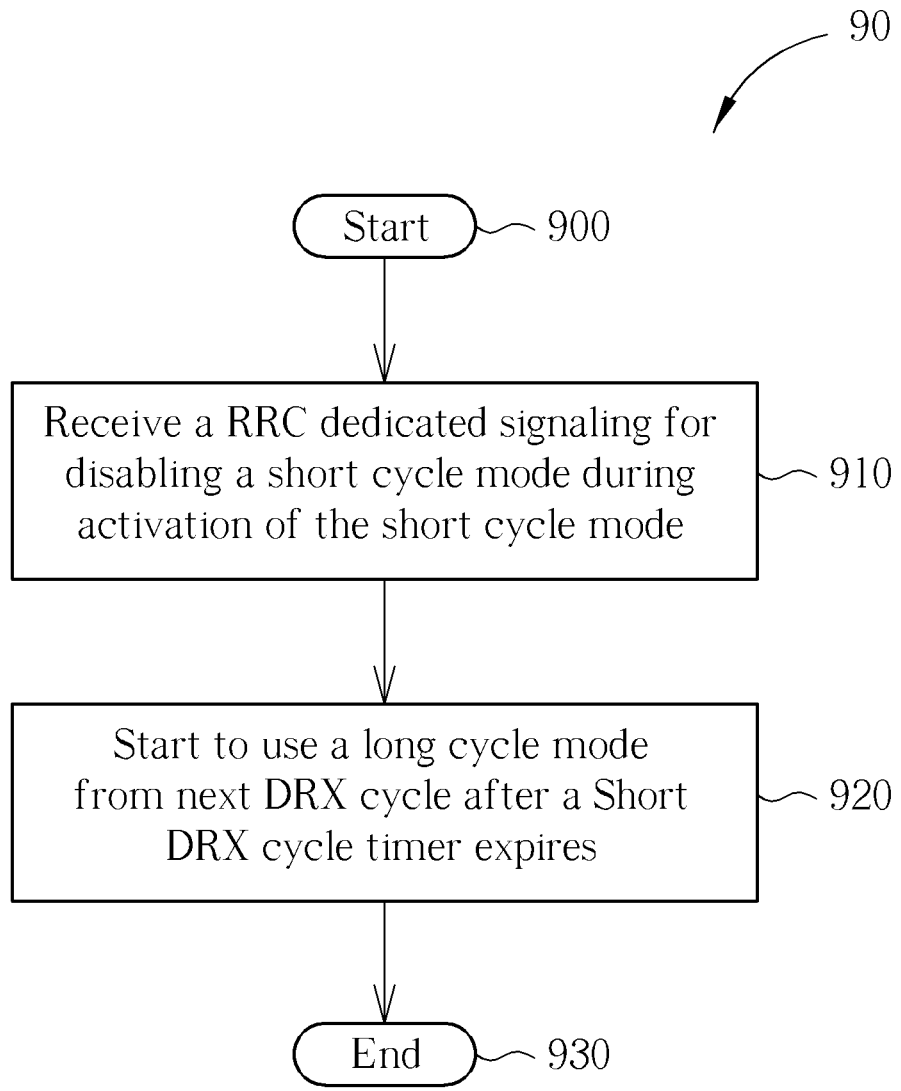

Please refer to FIG. 9, which illustrates a flowchart of a process 90 according to an embodiment of the present invention. The process 90 is utilized for reconfiguring MAC DRX parameters for a UE of a wireless communication system. The process 90 can be compiled into the program code 214 and includes the following steps:

Step 900: Start.

Step 910: Receive a RRC dedicated signaling for disabling a short cycle mode during activation of the short cycle mode.

Step 920: Start to use a long cycle mode from next DRX cycle after a Short DRX cycle timer expires.

Step 930: End.

According to the process 90, the UE receives the RRC dedicated signaling during the activation of the short cycle mode, and waits for expiry of the Short DRX cycle timer. After the Short DRX cycle timer expires, this means that the short cycle mode is deactivated, and the UE starts to use the long cycle mode from next DRX cycle. Through the process 90, the UE can avoid a sudden interruption of the short cycle mode.

Preferably, the UE starts to use the long cycle mode from next DRX cycle by applying a long DRX cycle for next DRX cycle.

Alternatively, Step 920 can be replaced by a step of starting to use the long cycle mode immediately when a DRX Command MAC control element is received from the network. Since the DRX Command MAC control element directly corresponds to MAC DRX operation, the long cycle mode shall be immediately applied.

Figure 10:
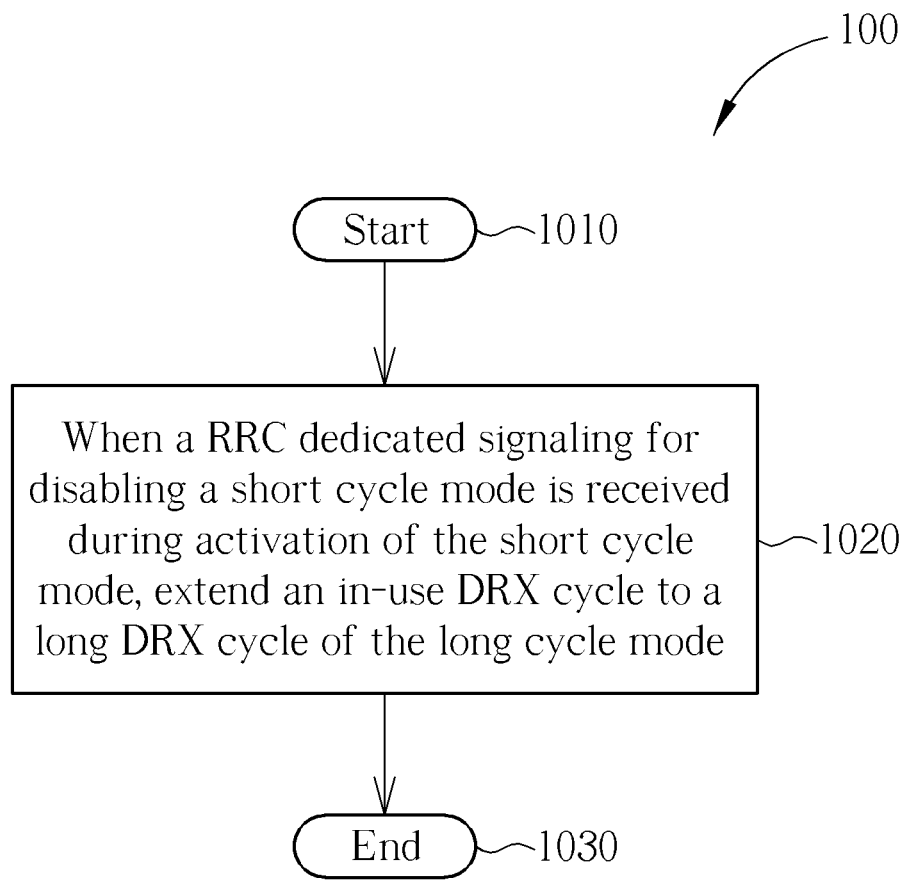

Please refer to FIG. 10, which illustrates a flowchart of a process 1000 according to an embodiment of the present invention. The process 1000 is utilized for reconfiguring MAC DRX parameters for a UE of a wireless communication system. The process 1000 can be compiled into the program code 214 and includes the following steps:

Step 1010: Start.

Step 1020: When a RRC dedicated signaling for disabling a short cycle mode is received during activation of the short cycle mode, extend an in-use DRX cycle to a long DRX cycle of the long cycle mode.

Step 1030: End.

According to the process 1000, the UE extends an in-use DRX cycle to the long DRX cycle when the RRC dedicated signaling is received during activation of the short cycle mode. The process 1000 can be also applied when starting subframe numbers for the short and long DRX cycles are the same.

In the process 80, 90, and 1000, the RRC dedicated signaling for disabling a short cycle mode can be the RRC CONNECTION RECONFIGURATION message including the "MAC-MainConfiguration", and a short DRX parameter of the "MAC-MainConfiguration" IE is set to 'disable'.

Figure 11:
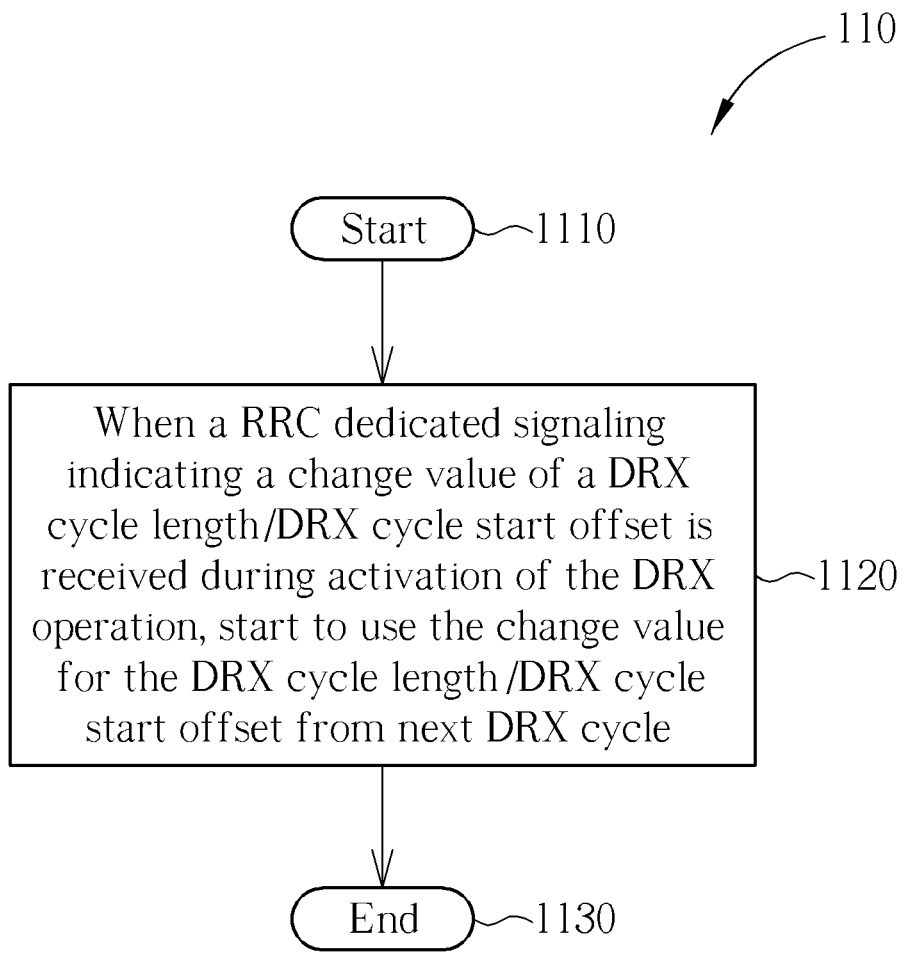

Please refer to FIG. 11, which illustrates a flowchart of a process 1100 according to an embodiment of the present invention. The process 1100 is utilized for reconfiguring MAC DRX parameters for a UE of a wireless communication system. The process 1100 can be compiled into the program code 214 and includes the following steps:

Step 1110: Start.

Step 1120: When a RRC dedicated signaling indicating a change value of a DRX cycle length/DRX cycle start offset is received during activation of the DRX operation, start to use the change value for the DRX cycle length/DRX cycle start offset from next DRX cycle.

Step 1130: End.

According to the process 1100, the UE starts to use the change value for the DRX cycle length/DRX cycle start offset from next DRX cycle when the change value of a DRX cycle length/DRX cycle start offset is received during activation of the DRX operation. In other words, the UE does not immediately reconfigure the current DRX cycle length/DRX cycle start offset to the change value during current DRX cycle, thereby avoiding unexpected system errors.

Figure 12:
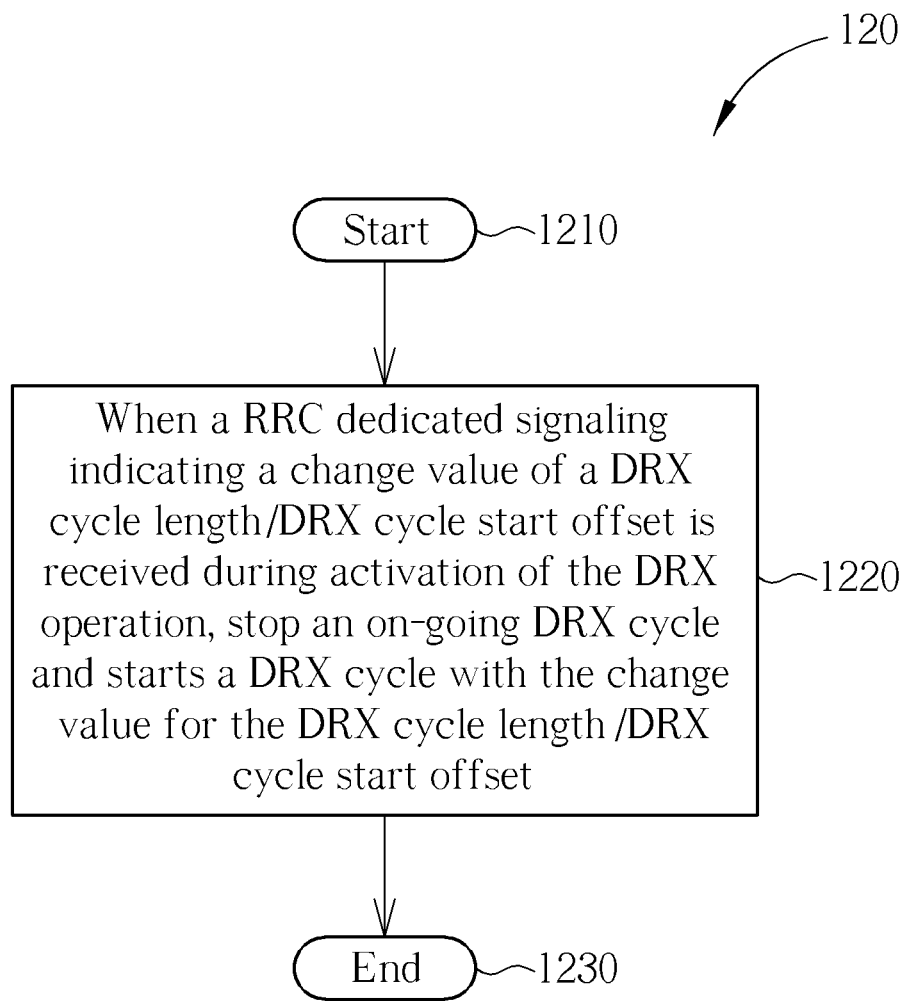

Please refer to FIG. 12, which illustrates a flowchart of a process 1200 according to an embodiment of the present invention. The process 1200 is utilized for reconfiguring MAC DRX parameters for a UE of a wireless communication system. The process 1200 can be compiled into the program code 214 and includes the following steps:

Step 1210: Start.

Step 1220: When a RRC dedicated signaling indicating a change value of a DRX cycle length/DRX cycle start offset is received during activation of the DRX operation, stop an on-going DRX cycle and starts a DRX cycle with the change value for the DRX cycle length/DRX cycle start offset.

Step 1230: End.

According to the process 1200, the UE stops the on-going DRX cycle and starts a new DRX cycle with the change value for the DRX cycle length/DRX cycle start offset when the change value is received during activation of the DRX operation. Therefore, the UE does not directly apply the change value for the on-going DRX cycle, thereby avoiding unexpected system errors.

In the process 1100 and 1200, the RRC dedicated signaling can be the RRC CONNECTION RECONFIGURATION message including the "MAC-MainConfiguration"

Figure 13:
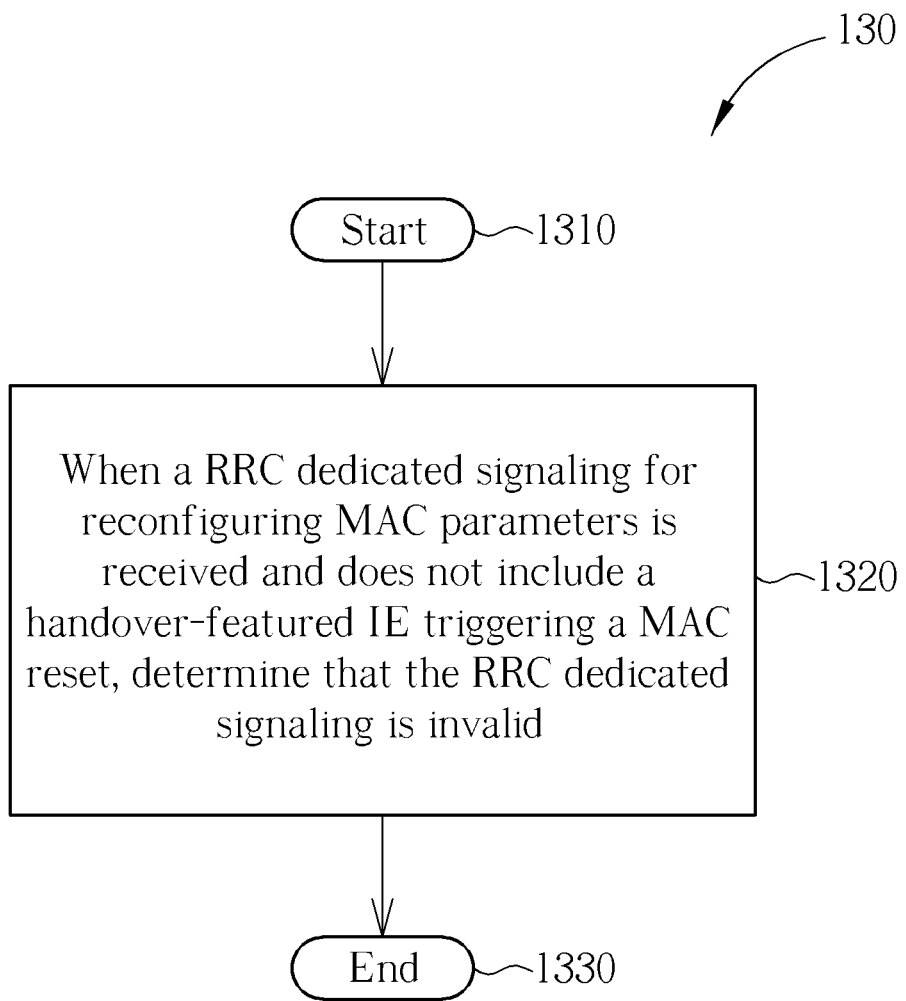

Please refer to FIG. 13, which illustrates a flowchart of a process 1300 according to an embodiment of the present invention. The process 1300 is utilized for reconfiguring MAC DRX parameters for a UE of a wireless communication system. The process 1300 can be compiled into the program code 214 and includes the following steps:

Step 1310: Start.

Step 1320: When a RRC dedicated signaling for reconfiguring MAC parameters is received and does not include a handover-featured information element (IE) triggering a MAC reset, determine that the RRC dedicated signaling is invalid.

Step 1330: End.

According to the process 1300, the UE considers that the RRC dedicated signaling is invalid when the RRC dedicated signaling that does not include the handover-featured IE is received. The handover-featured IE can trigger a reset of the MAC layer, and therefore system errors can be avoided when the UE applies the MAC parameters reconfiguration included in the RRC dedicated signaling immediately after the reset of the MAC layer.

Preferably, the RRC dedicated signaling for reconfiguring the MAC parameters is a RRC CONNECTION RECONFIGURATION message; the handover-featured IE is a mobilityControlInformation IE. In this situation, the UE further determines that a reconfiguration failure occurs and performs a RRC connection re-establishment procedure to recover the reconfiguration failure.

As can be seen from the above, the processes 40, 1100-1200 provide a method of starting to apply the reconfiguration of the parameter at next opportunity corresponding to the parameter when the RRC dedicated signaling for reconfiguration of the parameter is received during use of the parameter. In the processes 50-70, the UE mainly determines how to deal with the MAC parameter according to the change value. In the processes 80, 90, and 1000, the UE mainly switches from the short cycle mode to the long cycle mode with/without substantial stopping operation of the short cycle mode when the RRC dedicated signaling for disabling the short cycle mode is received during the activation of the short cycle mode.

In conclusion, the embodiments of the present invention do not immediately apply a reconfigured value for an in-use MAC parameter (e.g. a timer), and for the DRX operation, properly stop the short cycle mode and switch to the long cycle mode. Therefore, unexpected system errors in the MAC operation can be avoided.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for reconfiguring parameters of a discontinuous reception, hereinafter called DRX, operation of a medium access control layer for a mobile device of a wireless communication system, the method comprising:
    when a radio resource control dedicated signaling for disabling a short cycle mode of the discontinuous reception operation is received during activation of the short cycle mode, reconfiguring from the short cycle mode to a long cycle mode of the discontinuous reception operation;
    wherein reconfiguring from the short cycle mode to the long cycle mode of the discontinuous reception operation comprises extending an in-use short DRX cycle of the short cycle mode to a long DRX cycle of the long cycle mode;
    wherein the in-use short DRX cycle is a currently-running short DRX cycle.

2. The method of claim 1, wherein the radio resource control dedicated signaling indicates that a short DRX parameter is set to 'disable'.

* * * * *